US012812665B2

(12) United States Patent
Matsumura et al.

(10) Patent No.: US 12,812,665 B2
(45) Date of Patent: Nov. 24, 2026

(54) TERMINAL AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 295 days.

(21) Appl. No.: 18/695,860

(22) PCT Filed: Sep. 29, 2021

(86) PCT No.: PCT/JP2021/035876

§ 371 (c)(1),
(2) Date: Mar. 27, 2024

(87) PCT Pub. No.: WO2023/053271

PCT Pub. Date: Apr. 6, 2023

(65) Prior Publication Data

US 2024/0422801 A1 Dec. 19, 2024

(51) Int. Cl.

| | |
|---|---|
| ***H04W 4/06*** | (2009.01) |
| ***H04W 72/0453*** | (2023.01) |
| ***H04W 72/232*** | (2023.01) |
| ***H04W 72/30*** | (2023.01) |

(52) U.S. Cl.

CPC ....... *H04W 72/30* (2023.01); *H04W 72/0453* (2013.01); *H04W 72/232* (2023.01)

(58) Field of Classification Search

CPC . H04W 4/06; H04W 72/0453; H04W 72/232; H04W 72/30; H04W 76/40

See application file for complete search history.

(56) References Cited

U.S. PATENT DOCUMENTS

| | | | | |
|---|---|---|---|---|
| 11,902,974 | B2 * | 2/2024 | Lee | H04L 1/1822 |
| 12,004,184 | B2 * | 6/2024 | Ying | H04L 1/1812 |
| 12,245,249 | B2 * | 3/2025 | Yi | H04B 7/0626 |
| 2022/0110148 | A1 * | 4/2022 | Oh | H04W 72/23 |
| 2023/0371046 | A1 * | 11/2023 | Babaei | H04W 72/0457 |

OTHER PUBLICATIONS

"New Work Item on NR support of Multicast and Broadcast Services," RP-193248, 3GPP TSG RAN Meeting #86, Huawei, Dec. 2019.

(Continued)

*Primary Examiner* — Frank Duong

(74) *Attorney, Agent, or Firm* — METROLEX IP LAW GROUP, PLLC; Robert L. Scott, Esq.

(57) ABSTRACT

A terminal comprises: a reception unit that receives data via a downlink channel scheduled by common downlink control information common to a plurality of terminals in data delivering to the plurality of terminals; and a control unit that determines a size of at least one of a first field among fields included in the common downlink control information based on a common upper layer parameter used in the common downlink information; wherein the common upper layer parameter is defined separately from a dedicated upper layer parameter used in a dedicated downlink information dedicated to each of the plurality of terminals.

4 Claims, 12 Drawing Sheets

(56) References Cited

OTHER PUBLICATIONS

"Discussion on group scheduling mechanism for RRC_Connected UEs in MBS", 3GPP TSG RAN WG1 Meeting #104b-e R1-2102609, Apr. 2021, pp. 1-11, CATT, Cited in the ISR issued on May 17, 2022.
"Discussion on MBS group scheduling for RRC_Connected UEs", 3GPP TSG RAN WG1 #106-e R1-2106716, Aug. 2021, pp. 1-4, Spreadtrum Communications, Cited in the ISR issued on May 17, 2022.
"Discussion on group scheduling mechanism for RRC_Connected UEs in MBS", 3GPP TSG RAN WG1 Meeting #106-e R1-2106945, Aug. 2021, CATT, Cited in the ISR issued on May 17, 2022.
The International Search Report of a international application PCT/JP2021/035876 mailed on May 17, 2022.

* cited by examiner

FIG.9

| DCI format 1_1 | min | max | Higher layer parameter | |
|---|---|---|---|---|
| | | | parameter | IE |
| Identifier for DCI formats | 1 | 1 | | |
| Carrier indicator | 0 | 3 | cif-Presence | CrossCarrierSchedulingConfig |
| **Bandwidth part indicator** | 0 | 2 | **number of configured DL BWP** | |
| **Frequency domain resource assignment** | 9 | 19 | **locationAndBandwidth-Multicast** | **CFR-Config-Multicast** |
| **Time domain resource assignment** | 0 | 4 | pdsch-TimeDomainAllocationList | **pdsch-Config-Multicast/CFR-Config-Multicast** |
| **VRB-to-PRB mapping** | 0 | 1 | resourceAllocation | **pdsch-Config-Multicast/CFR-Config-Multicast** |
| **PRB bundling size indicator** | 0 | 1 | prb-BundlingType | **pdsch-Config-Multicast/CFR-Config-Multicast** |
| **Rate matching indicator** | 0 | 2 | rateMatchPatternGroup1 | **pdsch-Config-Multicast/CFR-Config-Multicast** |
| | | | rateMatchPatternGroup2 | **pdsch-Config-Multicast/CFR-Config-Multicast** |
| **ZP CSI-RS trigger** | 0 | 2 | aperiodic-ZP-CSI-RS-ResourceSetsToAddModList | **pdsch-Config-Multicast/CFR-Config-Multicast** |
| Modulation and coding scheme(TB1) | 5 | 5 | | |
| New data indicator(TB1) | 1 | 1 | | |
| Redundancy version(TB1) | 2 | 2 | | |
| **Modulation and coding scheme(TB2)** | 0 | 5 | maxNrofCodeWordsScheduledByDCI | **pdsch-Config-Multicast/CFR-Config-Multicast** |
| **New data indicator(TB2)** | 0 | 1 | maxNrofCodeWordsScheduledByDCI | **pdsch-Config-Multicast/CFR-Config-Multicast** |
| **Redundancy version(TB2)** | 0 | 2 | maxNrofCodeWordsScheduledByDCI | **pdsch-Config-Multicast/CFR-Config-Multicast** |
| HARQ process number | 4 | 4 | | |
| **Downlink assignment index** | 0 | 6 | **number of configured serving cell** | |
| | | | nfi-TotalDAI-Included-r16 | PhysicalCellGroupConfig |
| | | | pdsch-HARQ-ACK-Codebook-Multicast | PhysicalCellGroupConfig |
| | | | **CORESETPoolIndex** | ControlResourceSet/**pdcch-Config-Multicast** |
| | | | ackNackFeedbackMode | PhysicalCellGroupConfig |

FIG.10

| DCI format 1_1 | min | max | Higher layer parameter | |
|---|---|---|---|---|
| | | | parameter | IE |
| TPC command for scheduled PUCCH | 2 | 2 | | |
| PUCCH resource indicator | 3 | 3 | | |
| **PDSCH-to-HARQ feedback timing indicator** | 0 | 3 | dl-DataToUL-ACK | **pucch-Config-ACK/NACK-Multicast** |
| One-shot HARQ-ACK request | 0 | 1 | pdsch-HARQ-ACK-OneShotFeedback-r16 | PhysicalCellGroupConfig |
| PDSCH group index | 0 | 1 | pdsch-HARQ-ACK-Codebook | PhysicalCellGroupConfig |
| New feedback indicator | 0 | 2 | pdsch-HARQ-ACK-Codebook | PhysicalCellGroupConfig |
| | | | nfi-TotalDAI-Included-r16 | PhysicalCellGroupConfig |
| Number of requested PDSCH group(s) | 0 | 1 | pdsch-HARQ-ACK-Codebook | PhysicalCellGroupConfig |
| **Antenna port(s)** | 4 | 6 | dmrs-Type | DMRS-DownlinkConfig/**pdsch-Config-Multicast** |
| | | | maxLength | DMRS-DownlinkConfig/**pdsch-Config-Multicast** |
| **Transmission configuration indication** | 0 | 3 | tci-PresentInDCI | ControlResourceSet/**pdsch-Config-Multicast** |
| SRS request | 2 | 3 | supplementaryUplink | ServingCellConfig |
| CBG transmission information (CBGTI) | 0 | 8 | codeBlockGroupTransmission | PDSCH-ServingCellConfig |
| | | | maxCodeBlockGroupsPerTransportBlock | PDSCH-CodeBlockGroupTransmission |
| | | | maxNrofCodeWordsScheduledByDCI | PDSCH-Config |
| | | | priorityIndicatorDCI-1-1-r16 | PDSCH-Config |
| CBG flushing out information (CBGFI) | 0 | 1 | codeBlockGroupFlushIndicator | PDSCH-CodeBlockGroupTransmission |
| | | | priorityIndicatorDCI-1-1-r16 | PDSCH-Config |
| DMRS sequence initialization | 1 | 1 | | |
| **Priority indicator** | 0 | 1 | priorityIndicatorDCI-1-1-r16 | **pdsch-Config-Multicast** |
| ChannelAccess-Cpext | 0 | 4 | ul-AccessConfigListDCI-1-1 | PUCCH-Config |
| | | | ChannelAccessMode-r16 | ServingCellConfigCommon |
| **Minimum applicable scheduling offset indicator** | 0 | 1 | minimumSchedulingOffsetK0 | **pdsch-Config-Multicast** |
| SCell dormancy indication | 0 | 5 | dormancyGroupWithinActiveTime | DormantBWP-Config |

TERMINAL AND RADIO COMMUNICATION METHOD

TECHNICAL FIELD

The present disclosure relates to a terminal and a radio communication method corresponding to a multicast/broadcast service.

BACKGROUND ART

The 3rd Generation Partnership Project (3GPP) has specified the 5th generation mobile communication system (Also called 5G, New Radio (NR), or Next Generation (NG)) and is also in the process of specifying the next generation called Beyond 5G, 5G Evolution or 6G.

Release 17 of the 3GPP covers simultaneous data transmission (or delivery, as it may be called) services (tentatively called Multicast and Broadcast Services (MBS)) to specific or unspecified terminals (User Equipment, UE) in NR (Non-Patent Literature 1).

In the MBS, for example, a method (PTM-1) for scheduling a group common PDSCH is supported using a group common PDCCH (Physical Downlink Control Channel) common to a plurality of groups of UEs receiving data on the MBS.

CITATION LIST

Non-Patent Literature

[Non-Patent Literature 1] "New Work Item on NR support of Multicast and Broadcast Services," RP-193248, 3GPP TSG RAN Meeting #86, 3GPP, December 2019

SUMMARY OF INVENTION

Against this background, the inventors, etc., as a result of careful consideration, have concluded that the downlink control information (DCI) transmitted by the group common PDCCH in the PTM-1; If the size of the field included in the downlink control information (DCI) is not known to a plurality of UEs receiving MBS data, the UE cannot properly decode the DCI transmitted by the group common PDCCH.

Accordingly, the present disclosure is made in view of such a situation, and it is an object of the present disclosure to provide a terminal and a radio communication method capable of appropriately decoding a DCI used for scheduling data relating to an MBS.

One aspect of the disclosure is a terminal comprising: a reception unit that receives data via a downlink channel scheduled by common downlink control information common to a plurality of terminals in data delivering to the plurality of terminals; and a control unit that determines a size of at least one of a first field among fields included in the common downlink control information based on a common upper layer parameter used in the common downlink information; wherein the common upper layer parameter is defined separately from a dedicated upper layer parameter used in a dedicated downlink information dedicated to each of the plurality of terminals.

One aspect of the disclosure is a radio communication method comprising: receiving data via a downlink channel scheduled by common downlink control information common to a plurality of terminals in data delivering to the plurality of terminals; and determining a size of at least one of a first field among fields included in the common downlink control information based on a common upper layer parameter used in the common downlink information; wherein the common upper layer parameter is defined separately from a dedicated upper layer parameter used in a dedicated downlink information dedicated to each of the plurality of terminals.

BRIEF DESCRIPTION OF DRAWINGS

FIG. 9 is a diagram for explaining the DCI field.

FIG. 10 is a diagram for explaining the DCI field.

MODES FOR CARRYING OUT THE INVENTION

Figure 1:
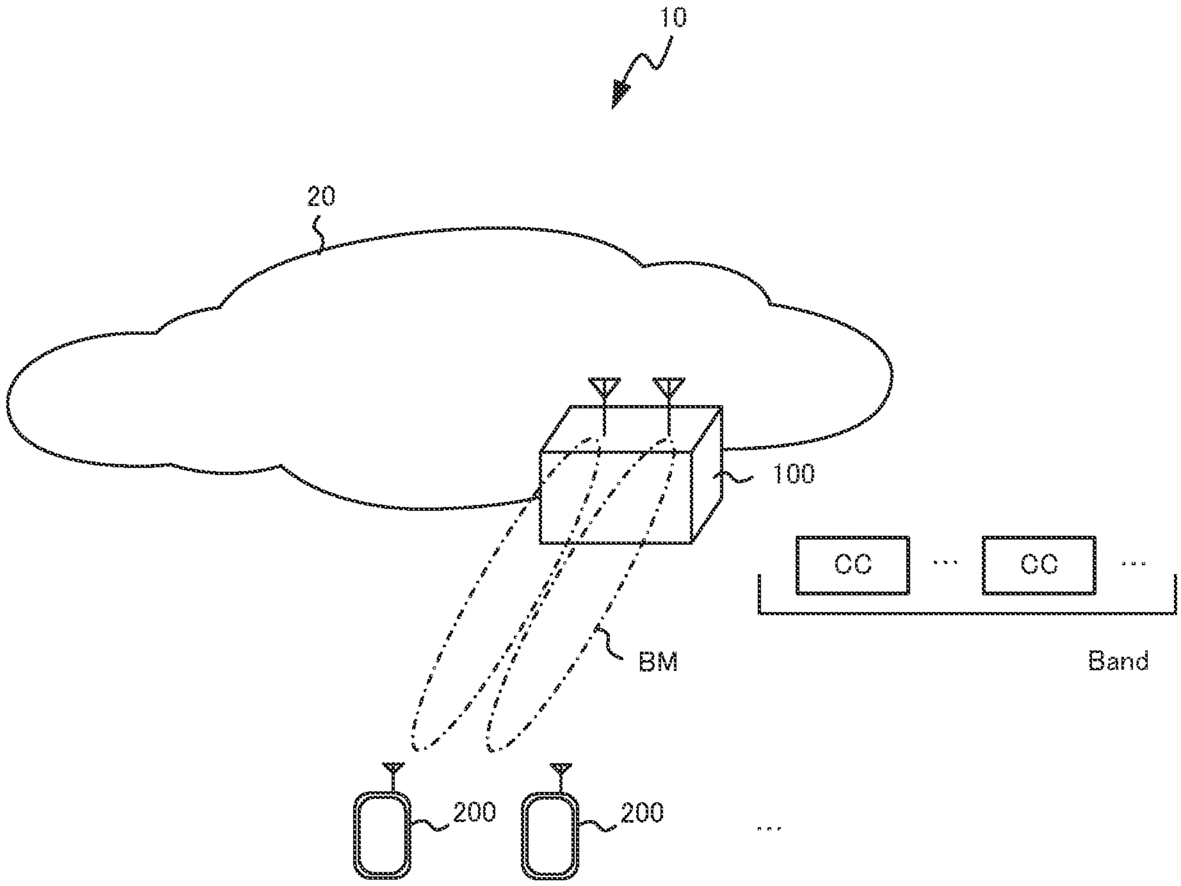
FIG. 1 is an overall schematic diagram of the radio communication system 10.

Exemplary embodiments of the present invention are explained below with reference to the accompanying drawings. The same functions and structures are denoted by the same or similar reference numerals, and their descriptions are omitted accordingly.

Embodiments (1) Overall Schematic Configuration of the Radio Communication System FIG. 1 is an overall schematic configuration diagram of the radio communication system 10 according to an embodiment, the radio communication system 10 is a radio communication system according to 5G New Radio (NR) and includes a Next Generation-Radio Access Network 20 (hereinafter referred to as NG-RAN 20 and a terminal 200 (UE (User Equipment) 200).

The radio communication system 10 may be a radio communication system according to a system called Beyond 5G, 5G Evolution or 6G.

The NG-RAN 20 includes a base station 100 (gNB 10000). The specific configuration of the radio communication system 10 including the number of the gNB 100 and the UE 200 is not limited to the example shown in FIG. 1. The NG-RAN 20 actually includes a plurality of NG-RAN Nodes, specifically a gNB (or ng-eNB), connected to a core network (5GC, not shown) according to 5G. Note that the NG-RAN 20 and the 5GC may be referred to simply as "networks".

The gNB 100 is a radio base station in accordance with 5G and performs radio communication in accordance with the UE 200 a and 5G. The gNB 100 and the UE 200 can support Massive MIMO (Multiple-Input Multiple-Output), which generates a more directional beam BM by controlling radio signals transmitted from multiple antenna elements; Carrier Aggregation (CA), which uses multiple component carriers (CCs) bundled together; and Dual Connectivity (DC), which communicates to two or more transport blocks simultaneously between the UE and each of two NG-RAN Nodes.

Figure 2:
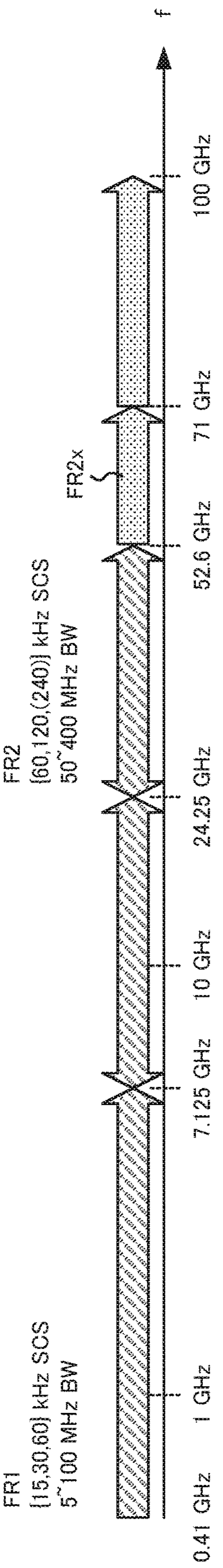
FIG. 2 is a diagram showing a frequency range used in the radio communication system 10.

The radio communication system 10 also supports multiple frequency range (FRs). FIG. 2 shows the frequency ranges used in radio communication system 10.

As shown in FIG. 2, the radio communication system 10 corresponds to FR1 FR and FR2. The frequency bands of each FR are as follows.

FR1: 410 MHz~7.125 GHz

FR2: 24.25 GHz~52.6 GHz

FR1 uses 15, 30 or 60 kHz sub-carrier spacing (SCS) and may use a 5~100 MHz bandwidth (BW). FR2 is higher frequency than FR1 and may use 60 or 120 kHz (may include 240 kHz) SCS and may use a 50~400 MHz bandwidth (BW).

SCS may be interpreted teas numerology. Numerology is defined in 3GPP TS38.300 and corresponds to one subcarrier interval in the frequency domain.

In addition, the radio communication system 10 corresponds to a higher frequency band than the frequency band of FR2. Specifically, the radio communication system 10 corresponds to a frequency band exceeding 52.6 GHz and up to 71 GHz or 114.25 GHz. Such a high frequency band may be referred to as "FR 2×" for convenience.

In order to solve the problem that the influence of phase noise increases in the high frequency band, a cyclic prefix orthogonal frequency division multiplexing (CP-OFDM)/discrete Fourier transform-spread (DFT-S-OFDM) with a larger sub-carrier spacing (SCS) may be applied when a band exceeding 52H.6 GHz is used.

Figure 3:
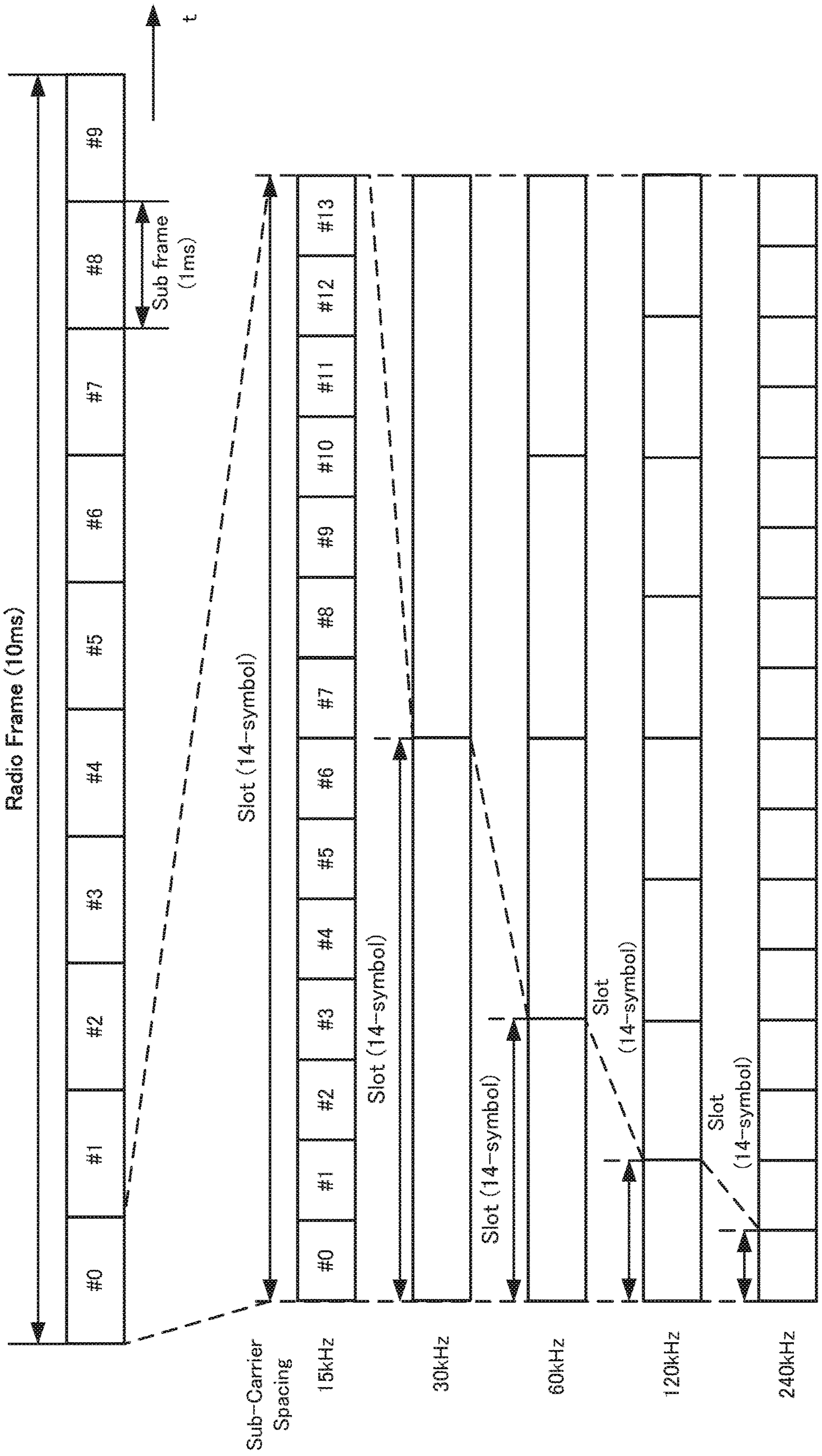
FIG. 3 is a diagram showing a configuration example of a radio frame, a sub-frame and a slot used in the radio communication system 10.

FIG. 3 shows a configuration example of a radio frame, a sub-frame and a slot used in radio communication system 10.

As shown in FIG. 3, a slot consists of 14 symbols, and the larger (wider) the SCS, the shorter the symbol per period (and slot period). The SCS is not limited to the interval (frequency) shown in FIG. 3. For example, 480 kHz, 960 kHz, and the like may be used.

The number of symbols constituting 1 slot may not necessarily be 14 symbols (For example, 1e28 symbols, 56 symbols). Furthermore, the number of slots per subframe may vary depending on the SCS.

Note that the time direction (t) shown in FIG. 3 may be referred to as a time domain, symbol period, symbol time, etc. The frequency direction may be referred to as a frequency domain, resource block, subcarrier, bandwidth part (BWP), etc.

A DMRS is a type of reference signal and is prepared for various channels. In this context, unless otherwise specified, a DMRS for a downlink data channel, specifically a PDSCH (Physical Downlink Shared Channel), may be used. However, a DMRS for an uplink data channel, specifically a PUSCH (Physical Uplink Shared Channel), may be interpreted in the same way as a DMRS for a PDSCH.

The DMRS may be used for channel estimation in a device, e.g., UE 200, as pas rt of a coherent demodulation. The DMRS may be present only in the resource block (RB) used for PDSCH transmission.

The DMRS may have more than one mapping type. Specifically, the DMRS may have a mapping type A and a mapping type B. In a mapping type A, the first DMRS is located in the second or third symbol of the slot. In a mapping type A, the DMRS may be mapped relative to the slot boundary regardless of where the actual data transmission is initiated in the slot. The reason why the first DMRS is placed in the second or third symbol of the slot may be interpreted as placing the first DMRS after the control resource sets (CORESET).

In mapping type B, the first DMRS may be placed in the first symbol of the data allocation. That is, the location of the DMRS may be given relative to where the data is located, rather than a relative to the slot boundary.

The DMRS may also have more than one type. Specifically, the DMRS may have Type 1 and Type 2. Type 1 and Type 2 differ in the maximum number of mapping and orthogonal reference signals in the frequency domain. Type 1 can output up to four orthogonal signals in single-symbol DMRS, and Type 2 can output up to eight orthogonal signals in double-symbol DMRS.

(2) Radio Communication System Functional Block Configuration

Next, a functional block configuration of the radio communication system 10 will be described.

First, a functional block configuration of the UE 200 will be described.

Figure 4:
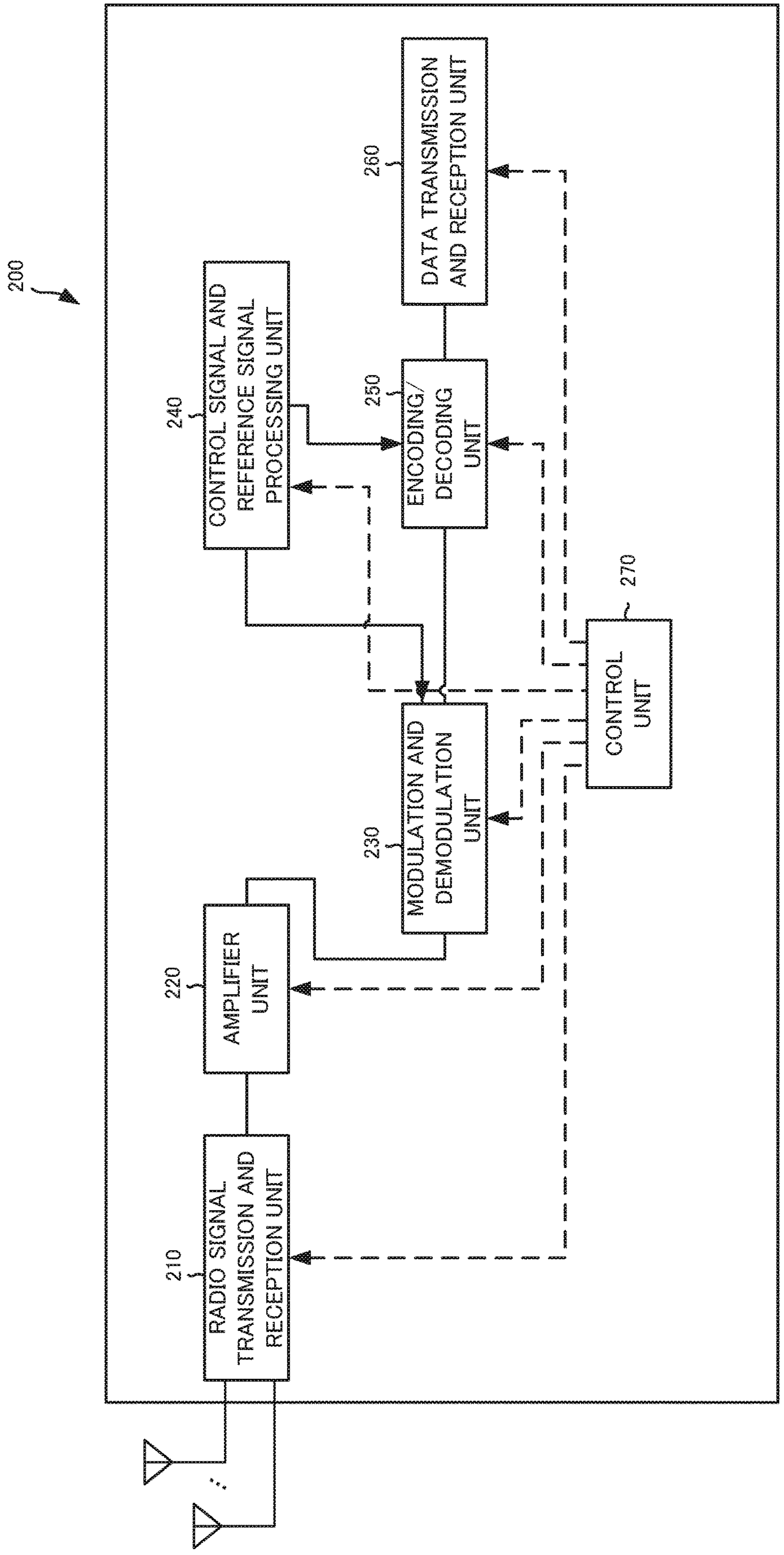
FIG. 4 is a functional block diagram of the UE 200.

FIG. 4 is a functional block configuration diagram of the UE 200. As shown in FIG. 4, the UE 200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals in accordance with the NR. the radio signal transmission and reception unit 210 corresponds to a Massive MIMO, a CA using a plurality of CCs bundled together, and a DC that simultaneously communicates between a UE and each of two NG-RAN Nodes.

The amplifier unit 220 is composed of a PA (Power Amplifier)/LNA (Low Noise Amplifier) or the like. the amplifier unit 220 amplifies the signal output from the modulation and demodulation unit 230 to a predetermined power level. the amplifier unit 220 amplifies the RF signal output from radio signal transmission and reception unit 210.

The modulation and demodulation unit 230 performs data modulation/demodulation, transmission power setting, resource block allocation, etc. for each predetermined communication destination (gNB 100 or other gNB). In the modulation and demodulation unit 230, Cyclic Prefix-Orthogonal Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing related to various control signals transmitted and received by the UE 200 and various reference signals transmitted and received by the UE 200.

Specifically, the control signal and reference signal processing unit 240 receives various control signals transmitted from the gNB 100 via a predetermined control channel, for example a radio resource control layer (RRC) control signal. the control signal and reference signal processing unit 240 also transmits various control signals to the gNB 100 via a predetermined control channel.

The control signal and reference signal processing unit 240 executes processing using a reference signal (RS) such as a demodulation reference signal S(DMRS) and a phase tracking reference signal (PTRS).

The DMRS is a known reference signal (pilot signal) between a base station and a terminal of each terminal for estimating a fading channel used for data demodulation. The PTRS is a reference signal of each terminal for estimating phase noise, which is a problem in a high frequency band.

In addition to the DMRS and the PTRS, the reference signal may include a Channel State Information-Reference Signal (CSI-RS), a Sounding Reference Signal (SRS), and a Positioning Reference Signal (PRS) for position information.

The channel may include a control channel and a data channel. The control channel may include PDCCH (Physical Downlink Control Channel), PUCCH (Physical Uplink Control Channel), RACH (Random Access Channel), Downlink Control Information (DCI) including Random Access Radio Network Temporary Identifier (RA-RNTI), and Physical Broadcast Channel (PBCH).

Data channels include PDSCH (Physical Downlink Shared Channel) and PUSCH (Physical Uplink Shared Channel). Data means data transmitted over a data channel. A data channel may be read as a shared channel.

Here, the control signal and reference signal processing unit 240 may receive downlink control information (DCI). The DCI includes existing fields for storing DCI Formats, Carrier indicator (CI), BWP indicator, Frequency Domain Resource Assignment (FDRA), Time Domain Resource Assignment (TDRA), Modulation and Coding Scheme (MCS), HPN (HARQ Process Number), New Data Indicator (NDI), Redundancy Version (RV), and the like.

The value stored in the DCI Format field is an information element that specifies the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by an information element (Bandwidth Part-Config) contained in the RRC message. The value stored in the FDRA field is an information element that specifies the frequency domain resource to which the DCI applies. The frequency domain resource is specified by the value stored in the FDRA field and the information element (RA Type) contained in the RRC message. The value stored in the TDRA field is the information element that specifies the time domain resource to which the DCI is applied. The time domain resource is specified by the value stored in the TDRA field and the information element (pdsch-TimeDomainAllocationList, pusch-TimeDomainAllocationList) contained in the RRC message. The time domain resource may be specified by the value stored in the TDRA field and the default table. The value stored in the MCS field is an information element that specifies the MCS to which the DCI applies. The MCS is specified by the value stored in the MCS and the MCS table. The MCS table may be specified by an RRC message or specified by RNTI scrambling. The value stored in the HPN field is an information element that specifies the HARQ Process to which the DCI is applied. The value stored in the NDI is an information element for identifying whether the data to which the DCI is applied is first-time data. The value stored in the RV field is an information element for specifying the redundancy of the data to which the DCI is applied.

The encoding/decoding unit 250 performs data partitioning/concatenation and channel coding/decoding for each predetermined communication destination (gNB 100 or other gNB).

Specifically, the encoding/decoding unit 250 divides the data output from the data transmission and reception unit 260 into predetermined sizes and performs channel coding for the divided data, the encoding/decoding unit 250 decodes the data output from the modulation and demodulation unit 230 and concatenates the decoded data.

The data transmission and reception unit 260 transmits and receives the protocol data unit (PDU) and the service data unit (SDU). Specifically, the data transmission and reception unit 260 performs assembly/disassembly of the PDU/SDU in a plurality of layers (Media Access Control layer (MAC), Radio Link Control layer (RLC), Packet Data Convergence Protocol layer (PDCP), etc.). The data transmission and reception unit 260 executes error correction and retransmission control of data based on HARQ (Hybrid Automatic Repeat Request).

In the embodiment, the data transmission and reception unit 260 constitutes a reception unit that receives data via a downlink channel in data delivering for a plurality of terminals (UE 200). Data delivering for a plurality of terminals may be referred to as Multicast and Broadcast Services (MBS). The downlink channel may include multicast (PDSCH) transmitted by multicast and unicast (PDSCH) transmitted by unicast. In the following, multicast (PDSCH) and unicast (PDSCH) are collectively referred to as multicast/unicast (PDSCH). The reception of multicast/unicast (PDSCH) may be read as the reception of data via multicast/unicast (PDSCH). Specifically, in the MBS, the data transmission and reception unit 260 receives data via a downlink channel (PDSCH) scheduled by common downlink control information (Common DCI) common to multiple terminals. The common DCI may be referred to as the DCI for the MBS.

The control unit 270 controls each functional block constituting the UE 200. In the embodiment, the control unit 270 constitutes control unit for determining the size of at least one first field among the fields included in the common DCI based on the common upper layer parameter used in the common DCI. The common upper layer parameter is defined separately from the dedicated upper layer parameter used in the dedicated downlink information (Dedicated DCI) dedicated to each of the plurality of UEs 200. The dedicated DCI may be referred to as the UE-specific DCI.

Here, the common DCI is the DCI carried by the Group-common PDCCH in the PTM-1 described below. The Group-common PDCCH is the PDCCH common to 2 or more UE 200 receiving data in the MBS, and the CRC of the Group-common PDCCH is scrambled by the G-RNTI. The common DCI may be considered as the DCI scrambled by the G-RNTI. On the other hand, the dedicated DCI is the DCI carried by the UE-specific PDCCH specific to UE 200. The UE-specific PDCCH may be used in PTM-2, which will be described later. The CRC of the UE-specific PDCCH is scrambled by the UE-specific RNTI. The UE-specific RNTI may include C (Cell)-RNTI, CS (Configured Scheduling)-RNTI, and MCS (Modulation Coding Scheme)-C-RNIT. The common DCI may be considered a DCI that is scrambled by the UE-specific RNTI.

Second, the functional block configuration of the gNB 100 will be described.

Figure 5:
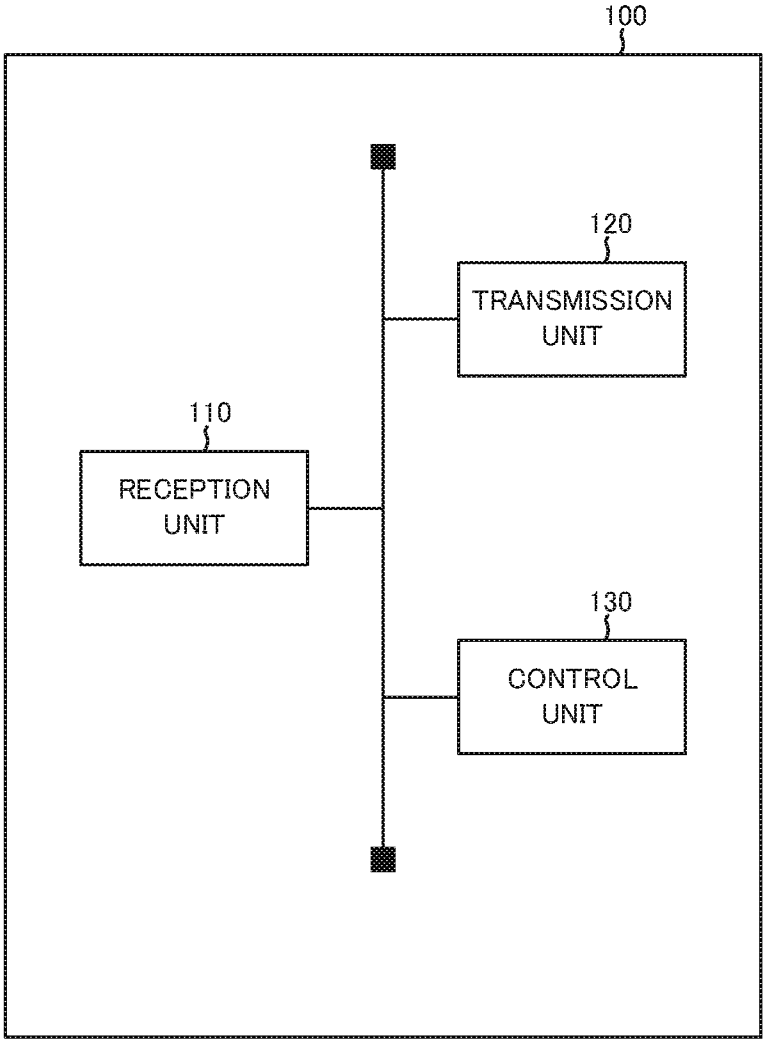
FIG. 5 is a functional block diagram of the gNB 100.

FIG. 5 is a functional block configuration diagram of the gNB 100. As shown in FIG. 5, the gNB 100 has a reception unit 110, a transmission unit 120, and a control unit 130.

The reception unit 110 receives various signals from the UE 200. The reception unit 110 may receive UL signals via PUCCH or PUSCH. In embodiments, the reception unit 110 may receive the feedback described above.

The transmission unit 120 transmits various signals to UE 200. transmission unit 120 may transmit DL signals via PDCCH or PDSCH. In embodiments, the transmission unit 120 may transmit multicast/unicast (PDSCH) at the MBS. The transmission of multicast/unicast (PDSCH) may be read as transmission of data via multicast/unicast (PDSCH).

The control unit 130 controls the gNB 100. In the embodiment, the control unit 130 may assume that the UE 200 determines the size of at least one first field among the fields included in the common DCI based on the common upper layer parameters used in the common DCI.

(3) Provision of the MBS

The radio communication system 10 may provide Multicast and Broadcast Services (MBS).

For example, in a stadium or hall, a large number of UE 200 s may be located in a certain geographic area and a large number of UE 200 s may simultaneously receive the same data. In such a case, the use of the MBS rather than unicast is effective.

The unicast may be interpreted as communication performed 1 to 1 with the network by specifying a specific UE 200 (identification information specific to the UE 200 may be specified).

The multicast may be interpreted as communication performed 1 to 1 with the network by specifying a specific plurality of UE 200 (identification information for multicast may be specified). As a result, the number of UE 200 that receive the received multicast data may be 1.

The broadcast may be interpreted as a communication between all UE 200 and the network in an unspecified number. The multicast/broadcast data may have the same copied content, but some content, such as headers, may be different. The multicast/broadcast data may also be transmitted (delivered) simultaneously, but does not necessarily require strict concurrency, and may include propagation delays and/or processing delays within the RAN node.

Note that the state of the radio resource control layer (RRC) of the target UE 200 may be either an idle state (RRC idle), a connected state (RRC connected), or another state (For example, the inactive state). The inactive state may be interpreted as a state in which some settings of the RRC are maintained.

MBS assumes the following three methods for scheduling multicast/broadcast PDSCH, specifically scheduling MBS packets (which may be read as data). The RRC connected UE may be read as RRC idle UE or RRC inactive UE.

Figure 6:
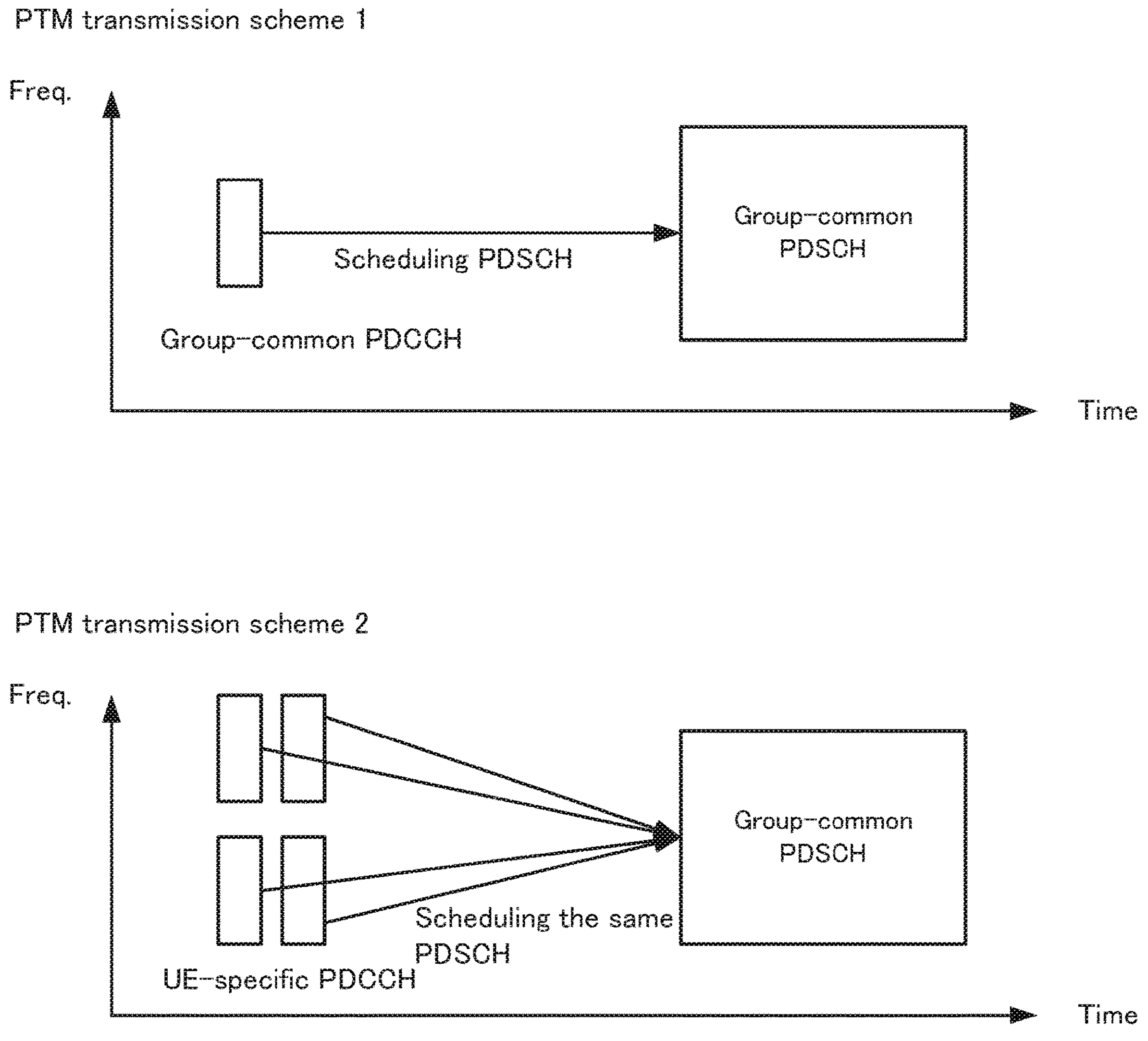
FIG. 6 is a diagram showing a configuration example of the PTM transmission system 1 and the PTM transmission system 2.

- PTM Transmission Method 1 (PTM-1):
  - Schedule group-common PDSCH using group-common PDCCH (Physical Downlink Control Channel) for the MBS group of RRC connected UE
  - CRC and PDSCH of PDCCH are scrambled by group-common RNTI (Radio Network Temporary Identifier, may be referred to as G-RNTI)
- PTM Transmission Method 2 (PTM-2):
  - Scheduling group-common PDSCH with UE-specific PDCCH for the MBS group of RRC connected UE
  - CRC of PDCCH is scrambled by UE-specific RNTI
  - PDSCH is scrambled by group-common RNTI
- PTP transmission method:
  - Scheduling UE-specific PDSCH with UE-specific PDCCH for RRC connected UE
  - CRC and PDSCH of PDCCH are scrambled by UE-specific RNTI. This may mean that MBS packets are transmitted by unicast FIG. 6 shows a configuration example of PTM transmission method 1 and PTM transmission method 2. Note that the UE-specific PDCCH/PDSCH can be identified by the target UE but cannot be identified by other UEs in the same MBS group. The group-common PDCCH/PDSCH is transmitted at the same time/frequency resource and can be identified by all UEs in the same MBS group. The names of the PTM transmission methods 1 and 2 are tentative and may be called by different names as long as the operations described above are performed.

In point-to-point (PTP) delivery, the RAN node may wirelessly deliver individual copies of the MBS data packets to individual UEs. In point-to-multipoint (PTM) delivery, the RAN node may wirelessly deliver a single copy of the MBS data packets to a set of UEs.

In order to improve the reliability of the MBS, the following two feedback methods are assumed for HARQ (Hybrid Automatic repeat request) feedback, specifically, HARQ feedback for multicast/broadcast PDSCH.

- Option 1: Feedback of both ACK and NACK (ACK/NACK feedback)
  - UE that successfully receives/decrypts PDSCH sends ACK
  - UE that fails to receive/decrypt PDSCH sends NACK
  - PUCCH (Physical Uplink Control Channel) resource configuration: PUCCH-Config can be configured for multicast
  - PUCCH resource: Shared/orthogonal between UEs depends on the network configuration
  - HARQ-ACK CB (codebook): Supports type-1 and type-2 (CB decision algorithm specified in 3GPP TS 38.213)
  - Multiplexing: Can apply unicast or multicast
- Option 2: NACK-only feedback
  - A UE that successfully receives or decrypts PDSCH does not send an ACK (does not send a response)
  - A UE that fails to receive or decrypt PDSCH sends a NACK
  - For a given UE, PUCCH resource settings can be configured separately by unicast or group cast (multicast)

The ACK may be called a positive acknowledgment, and the NACK may be called a negative acknowledgment. The HARQ may be called an automatic resend request.

For the enable/disable of Option 1 or Option 2, the any one of followings may be applied.

- RRC and Downlink Control Information (DCI)
- RRC only

In addition, the following is expected for semi-persistent scheduling (SPS) for multicast/broadcast PDSCH:

- Adopts SPS group-common PDSCH
- Multiple SPS group-common PDSCH can be configured for UE capability.
- HARQ feedback for SPS group-common PDSCH is possible
- At least activation/deactivation via group-common PDCCH (downlink control channel) is possible.

Note that deactivation may be replaced with other synonymous terms such as release. For example, activation may be replaced with start, start, trigger, etc., and deactivation may be replaced with end, stop, etc.

SPS is a scheduling used as a contrast to dynamic scheduling and may be referred to as semi-fixed, semi-persistent or semi-persistent scheduling and may be interpreted as Configured Scheduling (CS).

Scheduling may be interpreted as the process of allocating resources to transmit data. Dynamic scheduling may be interpreted as the mechanism by which all PDSCH are scheduled by DCI (For example, DCI1_0, DCI1_1, or DCI1_2). SPS may be interpreted as the mechanism by which PDSCH transmissions are scheduled by higher layer signaling, such as RRC messages.

Also, regarding the physical layer, there may be a scheduling category of time domain scheduling and frequency domain scheduling.

Also, multicast, group cast, broadcast, and MBS may be interchanged. Multicast PDSCH and PDSCH scrambled by group common RNTI may be interchanged.

Further, the terms data and packet may be interchanged and may be interpreted as synonymous with terms such as signal, data unit, etc. Transmission, reception, transmission and delivery may be interchanged.

(4) Issues

In the embodiment, attention will be paid to the PTM-1 described above. In the PTM-1, the Group-common PDCCH (common DCI) is scrambled by the G-RNTI, so that if the size of the field included in the common DCI is different for each UE 200, each UE 200 cannot properly decode the common DCI. In other words, the size of the field included in the common DCI must be known for 2 or more UE 200 receiving data in the MBS.

In light of these issues, in the embodiment, the common upper layer parameters used in the common DCI common to the plurality of UE 200 are defined separately from the dedicated upper layer parameters used in the dedicated DCI specific to each of the plurality of UE 200.

(5) Upper Layer Parameters

An example of upper layer parameters will be described below. The upper layer parameters may be RRC parameters set by RRC messages. Here, the Time Domain Resource Assignment (TDRA) field is exemplified as a field included in the DCI. The upper layer parameter used in the TDRA field may be pdsch-TimeDomainAllocationList.

Figure 7:
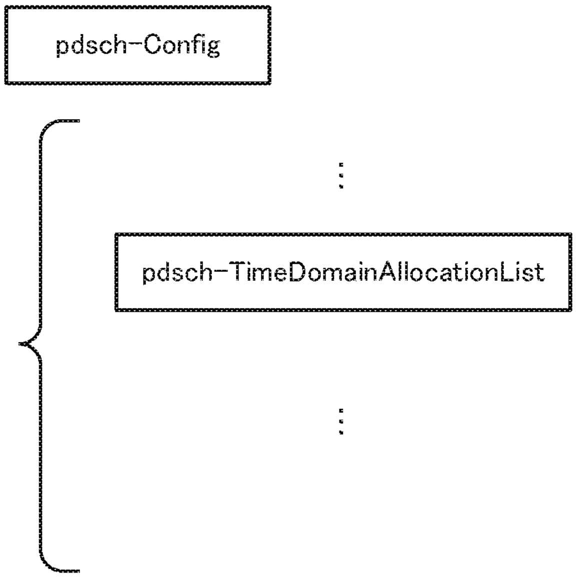
FIG. 7 is a diagram for explaining the upper layer parameters.

First, the specific upper layer parameter used in the specific DCI specific to each of the plurality of UE 200 will be described. As shown in FIG. 7, the second upper layer parameter may be a pdsch-TimeDomainAllocationList included in pdsch-Config. The TDRA field of the native DCI stores a value specifying the row Index included in the pdsch-TimeDomainAllocationList. That is, the size of the TDRA field in the dedicated DCI is determined by the pdsch-TimeDomainAllocationList contained in pdsch-Config.

Figure 8:
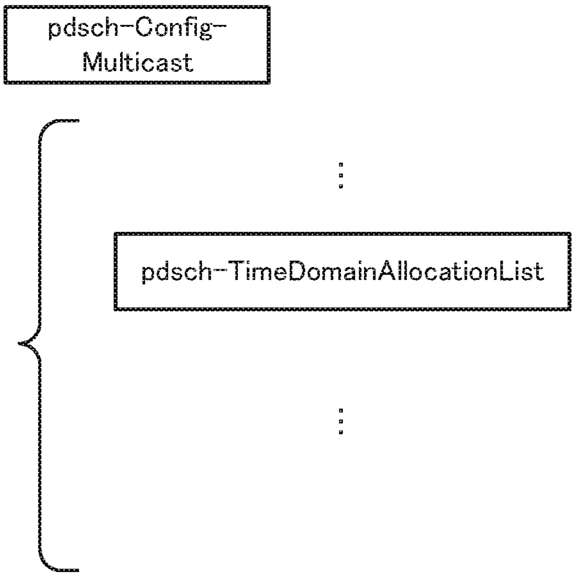
FIG. 8 is a diagram for explaining the upper layer parameters.

Second, it is explained in terms of the common upper-layer parameters used in the common DCI common to the plurality of UE 200. As shown in FIG. 8, the first upper-layer parameter may be a pdsch-TimeDomainAllocationList included in pdsch-Config-Multicast. The TDRA field of the common DCI stores a value specifying the row Index included in the pdsch-TimeDomainAllocationList. That is, the size of the TDRA field of the common DCI is determined by the pdsch-TimeDomainAllocationList included in pdsch-Config-Multicast. The name of pdsch-Config-Multicast is an example and is not limited thereto. It may be set as an RRC parameter related to MBS, such as xx-Multicast or xx-Mbs (xx, such as pdsch-Config or CFR-Config). The following description assumes that the RRC parameter of the name of xx-Multicast is specified in Rel. 17, but the name of the RRC parameter (the name of "xx" or the name of "-Multicast") is not limited to the examples in this specification. The xx-Multicast described in this specification may be read as the (or configured for the MBS) RRC parameter set in relation to MBS.

As noted above, the TDRA field for a dedicated DCI is determined by the pdsch-TimeDomainAllocationList contained in pdsch-Config, and the size of the TDRA field for a common DCI is determined by the pdsch-TimeDomainAllocationList contained in pdsch-Config-Multicast. In the embodiment, the same name (pdsch-TimeDomainAllocationList) is used as the name of the information element that determines the size of the TDRA field, but the information element containing pdsch-TimeDomainAllocationList is different between the common upper layer parameter used for the common DCI and the dedicated upper layer parameter used for the dedicated DCI. That is, the common upper layer parameter (pdsch-TimeDomainAllocationList in pdsch-Config-Multicast) is defined separately from the dedicated upper layer parameter (pdsch-TimeDomainAllocationList in pdsch-Config).

(6) DCI Fields

The common DCI fields will be described below using DCI format 1_1 as an example. The common DCI may be DCI format 1_0 or DCI format 1_2. In such a case, the common DCI having DCI format 1_0 may be referred to as the first DCI, the common DCI having DCI format 1_1 may be referred to as the second DCI, and the common DCI having DCI format 1_2 may be referred to as the third DCI.

For example, a DCI having DCI format 1_1 may have the fields shown in FIGS. 9 and 10. In FIGS. 9 and 10, min represents the minimum number of bits in the size of the field, and max represents the maximum number of bits in the size of the field. parameter represents a parameter that determines the size of each field, and IE represents an information element including parameter. Upper layer parameters may be considered to be defined by parameter and IE.

As shown in FIGS. 9 and 10, the common DCI common to 2 or more UEs 200 receiving data in the MBS of PTM-1 may include a first field whose size is determined by the common upper layer parameter. The first field may include the following fields:

The first field may include the Bandwidth part indicator field. The size of the Bandwidth part indicator may be determined based on the number of configured bandwidth parts (BWP) for the MBS (number of configured DL BWPs). The number of configured DL BWP is an example of a common upper layer parameter.

The first field may include a Frequency Domain Resource Assignment (FDRA) field. The size of the FDRA field may be determined based on locationAndBandwidth-Multicast included in Common Frequency Resource (CFR)-Config-Multicast. locationAndBandwidth-Multicast included in CFR-Config-Multicast is an example of a common upper-layer parameter.

The resource allocation type used to determine the size of the FDRA field may be specified by a specific upper-layer parameter or by a common upper-layer parameter. The resource allocation type that can be specified by the common upper-layer parameter may be limited to a specific resource allocation type.

The first field may include a Time Domain Resource Assignment (TDRA) field. The size of the TDRA field may be determined based on the pdsch-TimeDomainAllocation-List included in pdsch-Config-Multicast in CFR-Config-Multicast. The pdsch-TimeDomainAllocationList included in pdsch-config-Multicast in CFR-Config-Multicast is an example of a common upper-layer parameter. Note that the pdsch-TimeDomainAllocationList may have the same name as that used for the dedicated upper-layer parameter (pdsch-Config).

The first field may include a VRB-toPRB mapping field. The size of the VRB-toPRB mapping field may be determined based on the resourceAllocation included in pdsch-Config-Multicast in CFR-Config-Multicast. The resourceAllocation included in pdsch-config-Multicast in CFR-Config-Multicast is an example of a common upper-layer parameter. Note that resourceAllocation may be the same as the name used for the dedicated upper-layer parameter (pdsch-Config).

The first field may include a PRB bundling size indicator field. The size of the PRB bundling size indicator field may be determined based on the prb-Bundlingtype included in pdsch-Config-Multicast in CFR-Config-Multicast. The prb-Bundlingtype included in pdsch-config-Multicast in CFR-Config-Multicast is an example of a common upper-layer parameter. Note that the prb-Bundlingtype may be the same as the name used for the dedicated upper layer parameter (pdsch-Config).

The first field may include a Rate matching indicator field. The size of the Rate matching indicator field may be determined based on rateMatchPatternGroup1 and rateMatchPatternGroup2 included in pdsch-Config-Multicast of CFR-Config-Multicast. rateMatchPatternGroup1 and rateMatchPatternGroup2 included in pdsch-config-Multicast of CFR-Config-Multicast are examples of common upper-layer parameters. Note that rateMatchPatternGroup1 and rateMatchPatternGroup2 may have the same names as those used in the dedicated upper-layer parameter (pdsch-Config).

The first field may include a ZP CSI-RS trigger field. The size of the ZP CSI-RS trigger field may be determined based on the aperiodic-ZP-CSI-RS-ResourceSetsToAddModList included in pdsch-Config-Multicast for CFR-Config-Multicast. The aperiodic-ZP-CSI-RS-ResourceSetsToAddModList included in pdsch-config-Multicast for CFR-Config-Multicast is an example of a common upper-layer parameter. Note that the aperiodic-ZP-CSI-RS-ResourceSetsToAddModList may be the same as the name used for the dedicated upper-layer parameter (pdsch-Config).

The first field may include a modulation and coding scheme (TB2) field. The size of the modulation and coding scheme (TB2) field may be determined based on the maxNrofCodeWordsScheduledByDCI included in pdsch-Config-Multicast for CFR-Config-Multicast. The maxNrofCodeWordsScheduledByDCI included in pdsch-config-Multicast for CFR-Config-Multicast is an example of a common upper-layer parameter. Note that the maxNrofCodeWordsScheduledByDCI may be the same as the name used for the dedicated upper-layer parameter (pdsch-Config).

The first field may include a New data indicator (TB2) field. The size of the New data indicator (TB2) field may be determined based on the maxNrofCodeWordsScheduledByDCI included in pdsch-Config-Multicast in CFR-Config-Multicast. The maxNrofCodeWordsScheduledByDCI included in pdsch-config-Multicast in CFR-Config-Multicast is an example of a common upper-layer parameter. Note that the maxNrofCodeWordsScheduledByDCI may be the same as the name used for the dedicated upper-layer parameter (pdsch-Config).

The first field may include a redundancy version (TB2) field. The size of the redundancy version (TB2) field may be determined based on the maxNrofCodeWordsScheduledByDCI included in pdsch-Config-Multicast for CFR-Config-Multicast. The maxNrofCodeWordsScheduledByDCI included in pdsch-config-Multicast for CFR-Config-Multicast is an example of a common upper-layer parameter. Note that the maxNrofCodeWordsScheduledByDCI may be the same as the name used for the dedicated upper-layer parameter (pdsch-Config).

The first field may include a Downlink assignment index field. The size of the Downlink assignment index field may be determined based on the number of configured serving cells configured for the MBS, nfi-TotalDAI-Included-r16, pdsch-HARQ-ACK-Codebook-Multicast, CORESETPoolIndex, and ackNackFeedbackMode. The number of configured serving cells is an example of a common upper layer parameter. The pdsch-HARQ-ACK-Codebook-Multicast included in PhysicalCellGroupConfig is an example of a common upper layer parameter. The CORESETPoolIndex included in the ControlResourceSet for pdcch-Config-Multicast is an example of a common upper layer parameter. Note that nfi-TotalDAI-Included-r16, CORESETPoolIndex, ackNackFeedbackMode, PhysicalCellGroupConfig, and ControlResourceSet may have the same names as those used for specific upper layer parameters.

The first field may include a PDSCH-to-HARQ_feedback timing indicator field. The size of the PDSCH-to-HARQ-_feedback timing indicator field may be determined by dl-DataToUL-ACK included in pucch-Config-ACK/NACK-Multicast. dl-DataToUL-ACK included in pucch-Config-ACK/NACK-Multicast is an example of a common upper-layer parameter. Note that dl-DataToUL-ACK I may be the same as the name used for the dedicated upper-layer parameter (pucch-Config-ACK/NACK).

The first field may include an Antenna port(s) field. The size of the Antenna port(s) field may be determined based on the dmrs-type and maxLength included in DMRS-DownlinkConfig for pdsch-Config-Multicast. The dmrs-type and maxLength included in DMRS-DownlinkConfig for pdsch-Config-Multicast are examples of common upper-layer parameters. Note that the dmrs-type, maxLength, and DMRS-DownlinkConfig may be the same names used for dedicated upper-layer parameters.

The first field may include a Transmission configuration indication field. The size of the Transmission configuration indication field may be determined based on tci-PresentInDCI in the ControlResourceSet of pdsch-Config-Multicast. tci-PresentInDCI in the ControlResourceSet of pdsch-Config-Multicast is an example of a common upper-layer parameter. The names of the ControlResourceSet and tci-PresentInDCI may be the same as those used for the dedicated upper-layer parameter.

The first field may include a Priority indicator field. The size of the Priority indicator field may be determined based on the priorityIndicatorDCI-1-1-r16 included in pdsch-Config-Multicast. The priorityIndicatorDCI-1-1-r16 included in pdsch-Config-Multicast is an example of a common upper-layer parameter. The priorityIndicatorDCI-1-1-r16 may be the same as the name used for the dedicated upper-layer parameter (pdsch-Config).

The first field may include a Minimum applicable scheduling offset indicator field. The size of the Minimum applicable scheduling offset indicator field may be determined based on minimumSchedulingOffsetK0 included in pdsch-Config-Multicast. minimumSchedulingOffsetK0 included in pdsch-Config-Multicast is an example of a common upper layer parameter. Note that minimumSchedulingOffsetK0 may have the same name as that used for the dedicated upper layer parameter (pdsch-Config). Under such a premise, a common DCI having DCI format 1_1 may not have the following fields as compared with a dedicated DCI having DCI format 1_1. In other words, a common DCI may omit some fields included in the dedicated DCI.

For example, the common DCI may not include one or more fields selected from the following: Identifier for DCI formats, Carrier indicator, Bandwidth part indicator, One-shot HARQ-ACK request, PDSCH group index, New feedback indicator, Number of requested PDSCH group(s), SRS request, CBG transmission information (CBGTI), CBG flushing out information (CBGFI), ChannelAccess-Ctext, and SCell dormancy indication.

In such cases, fields not included in the common DCI may be predetermined in the radio communication system 10. Alternatively, for fields where the minimum number of bits (min) is 0, it may not be predetermined in the radio communication system 10 that the field is omitted because the size of the field can be set to 0 by the upper layer parameter.

In addition, the common DCI may include a second field whose size is determined by the dedicated upper layer parameter. The second field is a field different from the first field whose size is determined by the common upper layer parameter.

For example, the second field may include a Carrier indicator field. The size of the Carrier indicator field may be determined based on CrossCarrierSchedulingConfig. CrossCarrierSchedulingConfig is an example of a dedicated upper layer parameter. In these cases, the common DCI shall include a Carrier indicator field.

For fields whose size is not variable (For example, Modulation and coding scheme (TB1), New data indicator (TB1), Redundancy version (TB1), HARQ process number, TPC command for scheduled PUCCH, PUCCH resource indicator, etc.), it is not necessary to specify the size of the field in the common upper layer parameter.

The description of the transport block (TB) will be supplemented below. TB indicates the unit of block of data in the HARQ transmission. TB may be read as CW (Code Word).

For example, the field for TB1 (Modulation and coding scheme (TB1), New data indicator (TB1), Redundancy version (TB1)) may be the field used in the PDSCH of the MIMO layer of 1~4. The field for TB1 may be the field always included in the DCI. The field for TB2 (Modulation and coding scheme (TB2), New data indicator (TB2), Redundancy version (TB2)) may be the field used in the PDSCH of the 5~8 MIMO layer. The field for TB2 may be the field included in the DCI when maxNrofCodeWordsScheduledByDCI=2 is set.

Under these assumptions, the MBS may be assumed to use a PDSCH with a MIMO layer of at most m. For example, m may be 1. In other words, it may be assumed that only TB1 is used in MBS. Therefore, the PDSCH of the MBS may be controlled based on a common DCI that includes fields for TB1. In other words, the common DCI may not include fields for TB2.

FIGS. 9 and 10 illustrate only one example of a DCI field. Therefore, the common DCI may include at least one field as a first field whose size is determined by the common upper layer parameter. The common DCI may not include a second field whose size is determined by the dedicated upper layer parameter.

(7) Number of BWPs and Number of Serving Cells

As noted above, the size of the Bandwidth part indicator field included in the common DCI may be determined based on the number of BWPs configured for the MBS. Similarly, the size of the Downlink assignment index field included in the common DCI may be determined based on the number of Serving Cells configured for the MBS.

In such a case, it should be assumed that the number of BWP/Serving Cells used in the MBS may be different from the number of BWP/Serving Cells actually configured in UE 200. In such a case, the following options may be adopted.

In the first option, the number of BWPs/Serving Cells used in the MBS may be set to be equal to the number of BWPs/Serving Cells actually set in the UE 200. The UE 200 may not assume that the number of BWPs/Serving Cells used in the MBS is set to be different from the number of BWPs/Serving Cells actually set in the UE 200. In such a case, the number of BWPs/Serving Cells used in the MBS may not be set separately from the number of BWPs/Serving Cells actually set in the UE 200, and may be set separately from the number of BWPs/Serving Cells actually set in the UE 200.

In the second option, the number of BWPs/Serving Cells used in the MBS may be set separately from the number of BWPs/Serving Cells actually set in the UE 200. The number of BWP/Serving Cells used in the MBS may be set by an upper layer parameter. The UE 200 may assume that the number of BWP/Serving Cells used in the MBS is different from the number of BWP/Serving Cells actually set in the UE 200. However, the number of BWP/Serving Cells set in the MBS is not actually set in the UE 200, but is a parameter used to determine the size of the first field included in the common DCI. Note that the number of BWP/Serving Cells set in the MBS may be set as part of the RRC parameter related to the MBS, such as xx-Multicast.

Figure 11:
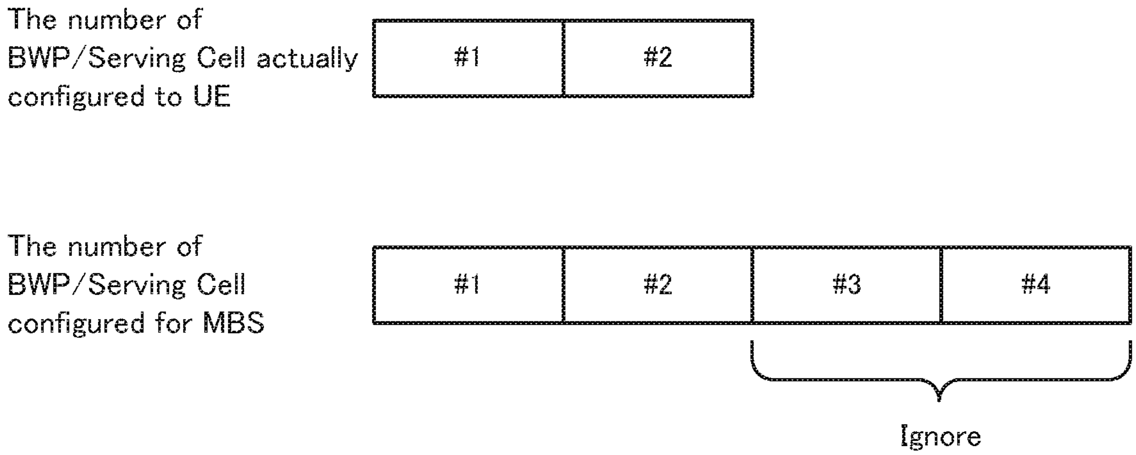
FIG. 11 is a diagram for explaining the number of BWP/Serving Cells.

First, the second option may assume that the number of BWP/Serving Cells set in the MBS is larger than the number of BWP/Serving Cells actually set in the UE 200. For example, as shown in FIG. 11, consider the case where the number of BWP/Serving Cells set in the MBS is 4 (#1 to #4) and the number of BWP/Serving Cells actually set in the UE 200 is 2 (#1 to #2). In such a case, the UE 200 may ignore the information elements related to #3 and #4 contained in the common DCI and common upper layer parameters. The information elements ignored by the UE 200 may be specified by the MSB (Most Significant Bit) or the LSB (Least Significant Bit).

Second, the second option does not have to assume a case in which the number of BWPs/Serving Cells configured for the MBS is smaller than the number of BWPs/Serving Cells actually configured for the UE 200. Alternatively, it may assume a case in which the number of BWPs/Serving Cells configured for the MBS is smaller than the number of BWPs/Serving Cells actually configured for the UE 200. In such a case, among the BWPs/Serving Cells actually configured for the UE 200, the BWP/Serving Cell used for the MBS may be selected in order of decreasing ID of the BWP/Serving Cell, and the BWP/Serving Cell used for the MBS may be selected in order of increasing ID of the BWP/Serving Cell.

(8) Operational Effects

In the embodiment, the UE 200 determines the size of at least one first field among the fields included in the common DCI based on the common upper layer parameter used in the common DCI common to 2 or more UEs 200 in the MBS. The common upper layer parameter is defined separately from the dedicated upper layer parameter used in the dedicated DCI specific to each of 2 or more UEs 200. With such a configuration, even in the case where the common DCI is carried by the PDCCH whose CRC is scrambled by the G-RNTI, the UE 200 can specify the size of the first field included in the common DCI and can properly decode the common DCI.

(9) Other Embodiments

Although the contents of the present invention have been described in accordance with the above embodiments, the present invention is not limited to these descriptions, and it is obvious to those skilled in the art that various modifications and improvements can be made.

In the foregoing disclosure, DCI format 1_0/1_1/1_2 is exemplified as the format designation of the common DCI in which the CRC was scrambled by G-RNIT. However, the foregoing disclosure is not limited thereto. The format designation of the common DCI in which the CRC was scrambled by G-RNIT may be a different designation.

Although not specifically mentioned in the foregoing disclosure, the following UE Capability may be defined. The UE Capability may include an information element indicating whether it has the capability to support the MBS. The UE Capability may include an information element indicating whether it has the capability to support the DCI format 1_1 used in the MBS. The UE Capability may include an information element indicating whether it has the capability to support the DCI format 1_0 used in the MBS. UE Capability may include an information element indicating whether it has the capability to support PTM-1. UE Capability may include an information element indicating whether it has the capability to support PTM-2. UE Capability may include an information element indicating whether it has the capability to support a common DCI where the CRC is scrambled by G-RNTI.

The foregoing disclosure may apply to UE 200 that has reported UE Capability having the capability to support MBS. The foregoing disclosure may apply to UE 200 that has reported UE Capability having the capability to support DCI format 1_1 used in MBS. The foregoing disclosure may apply to UE 200 that has reported UE Capability having the capability to support PTM-1. The foregoing disclosure may apply to UE 200 that has reported UE Capability having the capability to support common DCI where CRC is scrambled by G-RNTI. The foregoing disclosure may apply to UE 200 configured with MBS related operations.

Although the MBS PDSCH has been described as an example in the above disclosure, at least any of the above operation examples may also be applied to other downlink channels such as the MBS PDCCH. Furthermore, the above operation examples may be combined and applied in combination as long as there is no conflict.

In the above disclosure, configure, activate, update, indicate, enable, specify, and select may be interchanged. Similarly, link, associate, correspond, and map may be interchanged, and allocate, assign, monitor, and map may be interchanged.

In addition, specific, dedicated, UE-specific, and UE-specific may be interchanged. Similarly, common, shared, group-common, UE-common, and UE-shared may be interchanged.

The block diagram (FIGS. 4 and 5) used in the description of the above embodiment shows a block of functional units. Those functional blocks (structural components) can be realized by a desired combination of at least one of hardware and software. Means for realizing each functional block is not particularly limited. That is, each functional block may be implemented using a single device that is physically or logically coupled, or two or more devices that are physically or logically separated may be directly or indirectly (For example, using wire, wireless, etc.) connected and implemented using these multiple devices. The functional block may be implemented using the single device or the multiple devices combined with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions transmission is called a transmission unit (transmitting unit) or a transmitter. As described above, the method of realization of both is not particularly limited.

Figure 12:
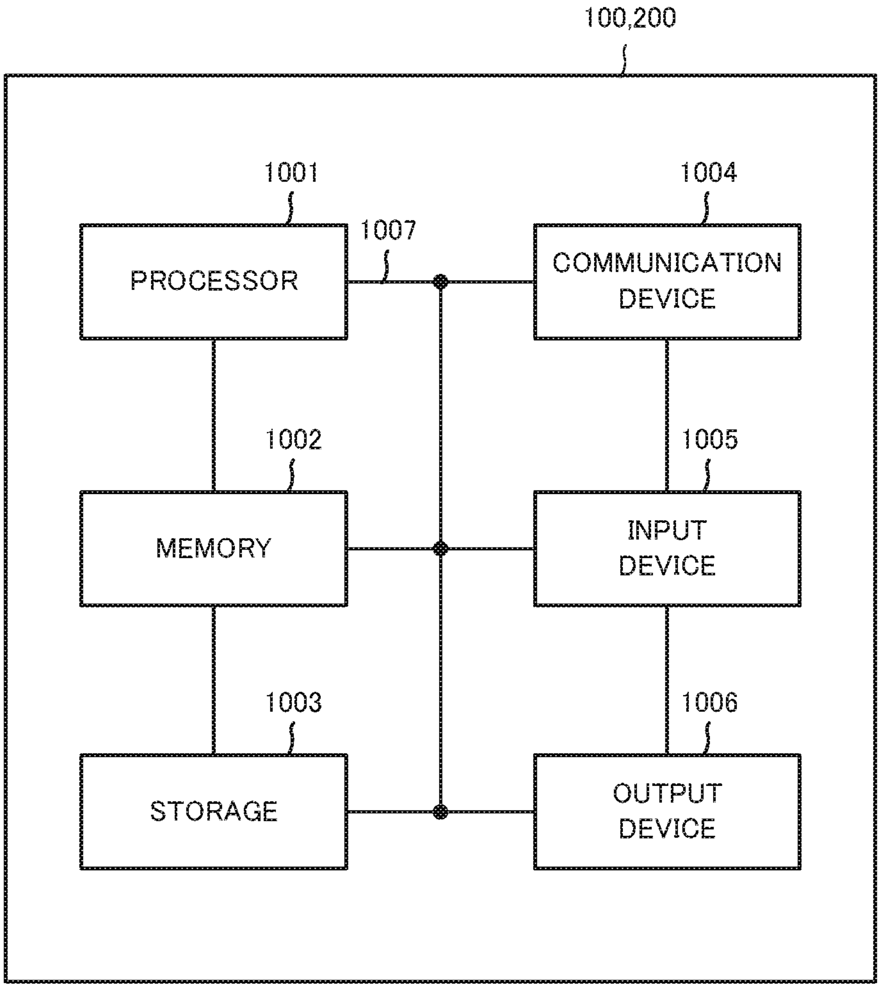
FIG. 12 is a diagram showing an example of a hardware configuration of gNB 100 and UE 200.

In addition, the above-mentioned gNB 100 and UE 200 (the device) may function as a computer for processing the radio communication method of the present disclosure. FIG. 12 is a diagram showing an example of a hardware configuration of the device. As shown in FIG. 12, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. The hardware configuration of the device may be configured to include one or more of the devices shown, or may be configured without some of the devices. Each functional block of the device (see FIG. 4) is implemented by any hardware element of the computer device, or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

Processor 1001, for example, operates an operating system to control the entire computer. Processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. In addition, the various processes described above may be performed by one processor 1001 or may be performed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), or the like. The memory 1002 may store a program (program code), a software module, or the like capable of executing a method according to an embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

In addition, the device may be configured to include hardware such as a microprocessor, a digital signal processor (DSP), an application specific integrated circuit (ASIC), a programmable logic device (PLD), a field programmable gate array (FPGA), etc., which may provide some or all of each functional block. For example, the processor 1001 may be implemented by using at least one of these hardware.

The notification of information is not limited to the aspects/embodiments described in the present disclosure and may be carried out using other methods. For example, the notification of information may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals, or a combination thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing steps, sequences, flowcharts, etc., of each of the embodiments/embodiments described in the present disclosure may be reordered as long as there is no conflict. For example, the method described in the present disclosure presents the elements of the various steps using an exemplary sequence and is not limited to the particular sequence presented.

The specific operation that is performed by the base station in the present disclosure may be performed by its upper node in some cases. It is apparent that in a network consisting of one or more network nodes having a base station, various operations performed for communication with a terminal may be performed by at least one of the base station and other network nodes (Examples include, but are not limited to, MME or S-GW.) other than the base station. In the above, an example in which there is one network node other than the base station is explained; however, a combination of a plurality of other network nodes (for example, MME and S-GW) may be used.

Information, signals (information, etc.) may be output from a higher layer (or lower layer) to a lower layer (or higher layer). It may be input and output via a plurality of network nodes.

The input/output information can be stored in a specific location (for example, a memory) or can be managed in a management table. Input/output information may be overwritten, updated, or added. The information can be deleted after outputting. The inputted information can be transmitted to another device.

The determination may be based on a value represented by a single bit (0 or 1), a true or false value (Boolean: true or false), or a numerical comparison (For example, comparison with a given value).

Each of the aspects/embodiments described in the present disclosure may be used alone, in combination, or alternatively in execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if software is transmitted from a website, server, or other remote source using at least one of wired technology (Coaxial, fiber-optic, twisted-pair, and digital subscriber lines (DSL)) and wireless technology (Infrared, microwave, etc.), at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltage, current, electromagnetic waves, magnetic fields or magnetic particles, optical fields or photons, or any combination thereof.

The terms described in the present disclosure and those necessary for understanding the present disclosure may be replaced with terms having the same or similar meanings. For example, at least one of a channel and a symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station may contain one or more (For example, three) cells, also called sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a base station performing communication services in this coverage and to a portion or the entire coverage area of at least one of the base station subsystems.

In the present disclosure, the terms "mobile station (Mobile Station: MS)," "user terminal," "user equipment (User Equipment: UE)," "terminal" and the like can be used interchangeably.

A mobile station may also be referred to by one of ordinary skill in the art as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other appropriate term.

At least one of a base station and a mobile station may be called a transmitting device, a receiving device, a communication device, or the e like. Note that, at least one of a base station and a mobile station may be a device mounted on a moving body, a moving body itself, or the like. The mobile may be a vehicle (For example, cars, planes, etc.), an unmanned mobile (For example, drones, self-driving cars), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, terms an uplink channel, a downlink channel, or the like may be read as a side channel.

Similarly, the mobile station in the present disclosure may be replaced with a base station. In this case, the base station may have the function of the mobile stat ion.

The radio frame may be composed of one or more frames in the time domain. Each frame or frames in the time domain may be called a subframe. The subframes may also be composed of one or more slots in the time domain. The subframes may be of a fixed time length (For example, 1 ms) independent of numerology.

The numerology may be a communication parameter applied to at least one of the transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like. The slot may consist of one or more symbols (Orthogonal Frequency Division Multiplexing (OFDM)) symbols, Single Carrier Frequency Division Multiple Access (SC-FDMA) symbols, etc., in tin the time domain. A slot may be a unit of time based on the numerology.

A slot may include a plurality of minislots. Each minislot may consist of one or more symbols in the time domain. A minislot may also be called a subslot. A minislot may be composed of fewer symbols than slots. The PDSCH (or PUSCH) transmitted in time units greater than the minislot may be referred to as the PDSCH (or PUSCH) mapping type A. The PDSCH (or PUSCH) transmitted using the minislot may be referred to as the PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as the transmission time interval (TTI), multiple consecutive subframes may be referred to as the TTI, and one slot or minislot may be referred to as the TTI. That is, at least one of the subframes and the TTI may be a subframe in the existing LTE (1 ms), a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called a TTI, one or more TTIs (That is, one or more slots or one or more minislots) may be the minimum time unit for scheduling. The number of slots (number of minislots) constituting the minimum time unit for scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. A TTI that is shorter than the normal TTI may be referred to as a shortened TTI, a short TTI, a partial or fractional TTI, a shortened subframe, a short subframe, a minislot, a subslot, a slot, or the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a time- and frequency-domain resource allocation unit that may include one or more consecutive subcarriers in the frequency domain. The number of subcarriers included in RB may be, for example, twelve, and the same regardless of the topology. The number of subcarriers included in the RB may be determined based on the neurology. The time domain of the RB may also include one or more symbols and may be one slot, one minislot, one subframe, or one TTI in length. The one TTI, one subframe, and the like may each consist of one or more resource blocks.

The one or more RBs may be called physical resource blocks (PRBs), sub-carrier groups (SCGs), resource element groups (REGs), PRB pairs, RB pairs, and the like.

The resource blocks may be composed of one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by the index of the RB relative to the common reference point of the carrier. PRB may be defined in BWP and numbered within that BWP.

BWP may include UL BWP (UL BWP) and DL BWP (DL BWP). For the UE, one or more BWPs may be set in one carrier.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in the radio frame, the number of slots per subframe or radio frame, the number of minislots included in the slot, the number of symbols and RBs included in the slot or minislot, the number of subcarriers included in the RB, and the number of symbols in the TTI, the symbol length, the cyclic prefix (CP) length, and the like may be varied.

The terms "connected," "coupled" or any variation thereof means any direct or indirect connection or combination between two or more elements and may include the presence of one or more intermediate elements between two elements "connected" or "coupled" to each other. The connection or connection between elements may be physical, logical or a combination thereof. For example, "connection" may be read as "access." As used in the present disclosure, two elements may be considered to be "connected" or "coupled" to each other using at least one of one or more wire, cable and printed electrical connections and, as some non-limiting and non-inclusive examples, electromagnetic energy having wavelengths in the radio frequency, microwave and optical (both visible and invisible) regions, etc.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to elements using designations such as "first" and "second" as used in this disclosure does not generally limit the quantity or order of those elements. Such designations can be used in the present disclosure as a convenient way to distinguish between two or more elements. Accordingly, references to first and second elements do not mean that only two elements may be employed therein, or that the first element must in any way precede the second element.

In the present disclosure, the used terms "include," "including," and variants thereof are intended to be inclusive in a manner similar to the term "comprising." Furthermore, it is intended that the term "or (or)" as used in the present disclosure is not an exclusive OR.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Figure 13:
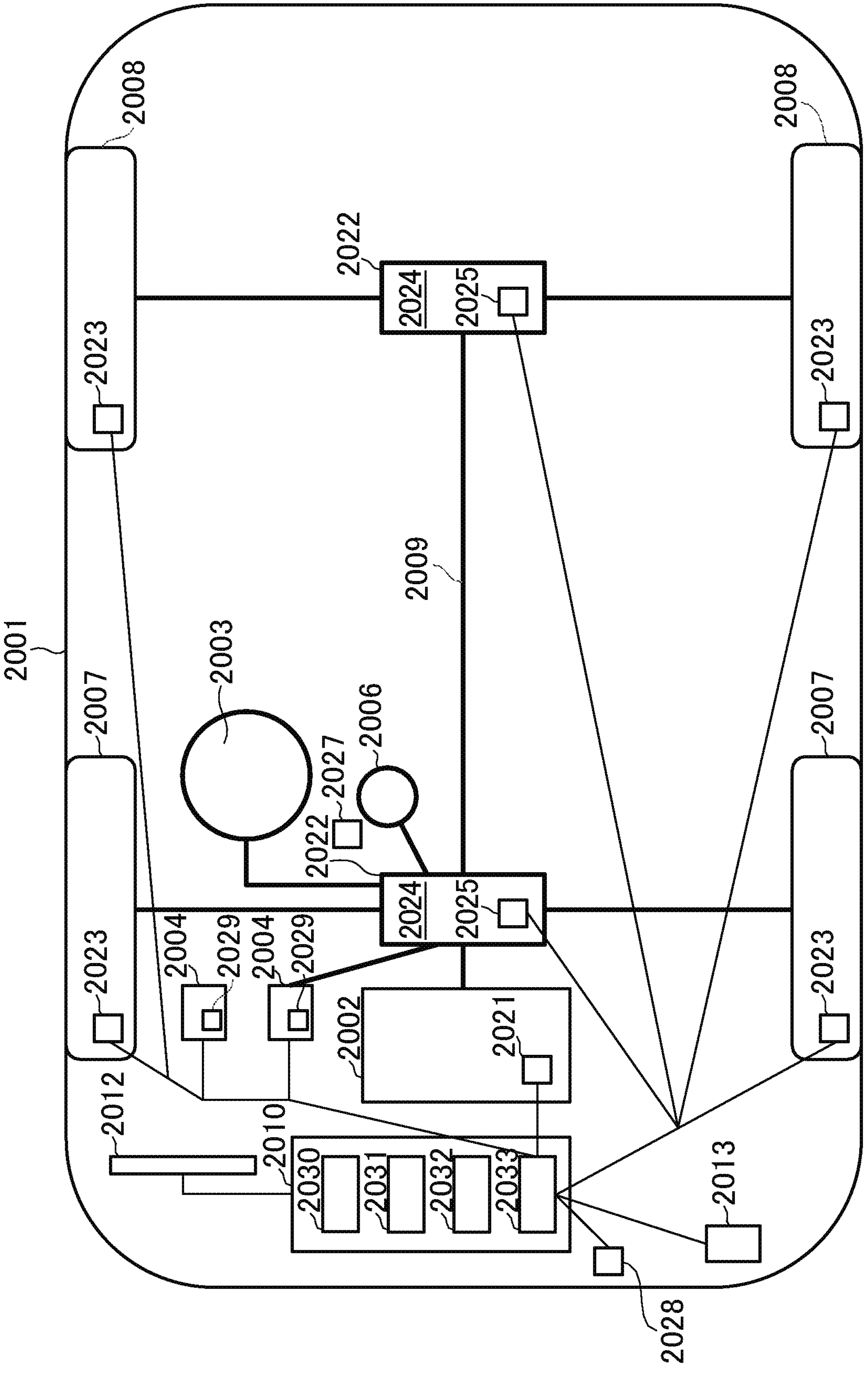
FIG. 13 is a diagram showing an example of a configuration of vehicle 2001.

FIG. 13 shows a configuration example of vehicle 2001. As shown in FIG. 13, vehicle 2001 includes drive unit 2002, steering unit 2003, accelerator pedal 2004, brake pedal 2005, shift lever 2006, left and right front wheels 2007, left and right rear wheels 2008, axle 2009, electronic control unit 2010, various sensors 2021~2029, information service unit 2012, and communication module 2013.

The drive unit 2002 is composed of, for example, an engine, a motor, and an engine-motor hybrid.

The steering unit 2003 includes at least a steering wheel and is configured to steer at least one of the front and rear wheels based on the operation of the steering wheel operated by the user.

The electronic control unit 2010 consists of a microprocessor 2031, a memory (ROM, RAM) 2032 and communication ports (IO ports) 2033. Signals from various sensors 2021~2027 provided in the vehicle are input to electronic control unit 2010. The electronic control unit 2010 may be referred to as an ECU (Electronic Control Unit).

The signals from the various sensors 2021~2028 include a current signal from a current sensor 2021 for sensing the current of a motor, a speed signal of a front wheel and a rear wheel acquired by the speed sensor 2022, a pressure signal of a front wheel and a rear wheel acquired by the air pressure sensor 2023, a speed signal of a vehicle acquired by the speed sensor 2024, an acceleration signal acquired by the acceleration sensor 2025, an accelerator pedal depressing amount signal acquired by the accelerator pedal sensor 2029, a brake pedal depressing amount signal acquired by the brake pedal sensor 2026, an operation signal of the shift lever acquired by the shift lever sensor 2027, and a detection signal acquired by the object detection sensor 2028 for detecting obstacles, vehicles, pedestrians, and the like.

information service unit 2012 comprises various devices such as a car navigation system, an audio system, a speaker, a television, and a radio for providing various information such as driving information, traffic information, and entertainment information, and one or more ECUs for controlling these devices. The information service unit 2012 provides various multimedia information and multimedia services to the occupants of the vehicle 2001 by utilizing information acquired from an external device via a communication module 2013 or the like.

A driver assistance system unit 2030 consists of various devices, such as millimeter-wave radar, LiDAR (Light Detection and Ranging), camera, positioning locator (e.g. GNSS), map information (e.g. high-definition (HD) maps, self-driving car (AV) maps, etc.), gyro system (e.g. IMU (Inertial Measurement Unit), INS (Inertial Navigation System), etc.), AI (Artificial Intelligence) chip, AI processor, which are used to provide functions to prevent accidents or reduce the driver's driving load, and one or more ECUs that control these devices. The driver assistance system unit 2030 also transmits and receives various information via the communication module 2013 to realize a driver assistance function or an automatic driving function.

The communication module 2013 can communicate with a microprocessor 2031 and components of the vehicle 2001 via a communication port. For example, communication module 2013 transmits and receives data via communication port 2033 to and from microprocessor 2031, memory (ROM, RAM) 2032, and sensor 2021~2028 in drive unit 2002, steering unit 2003, accelerator pedal 2004, brake pedal 2005, shift lever 2006, left and right front wheels 2007, left and right rear wheels 2008, axle 2009, and electronic control unit 2010 in vehicle 2001.

The communication module 2013 is a communication device that can be controlled by the microprocessor 2031 of the electronic control unit 2010 and can communicate with external devices. For example, it transmits and receives various information to and from external devices via radio communication. The communication module 2013 may be either inside or outside the electronic control unit 2010. The external device may be, for example, a base station, a mobile station, etc.

communication module 2013 transmits a current signal from a current sensor input to electronic control unit 2010 to an external device via radio communication. communication module 2013 also transmits, via radio communication, to an external device the speed signals of the front and rear wheels acquired by the speed sensor 2022, the air pressure signals of the front and rear wheels acquired by the air pressure sensor 2023, the vehicle speed signals acquired by the vehicle speed sensor 2024, the acceleration signals acquired by the acceleration sensor 2025, the accelerator pedal depressing amount signals acquired by the accelerator pedal sensor 2029, the brake pedal depressing amount signals acquired by the brake pedal sensor 2026, the shift lever operation signals acquired by the shift lever sensor 2027, and the detection signals acquired by the object detection sensor 2028 for detecting obstacles, vehicles, pedestrians, etc., which are inputted to electronic control unit 2010.

The communication module 2013 receives various kinds of information (traffic information, signal information, Inter-vehicular distance information, etc.) transmitted from an external device and displays them to the information service unit 2012 provided in the vehicle. The communication module 2013 also stores various information received from external devices in the memory 2032 available by the microprocessor 2031. Based on the information stored in the memory 2032, the microprocessor 2031 may control drive unit 2002, steering unit 2003, accelerator pedal 2004, brake pedal 2005, shift lever 2006, left and right front wheels 2007, left and right rear wheels 2008, axle 2009, sensor 2021~2028, etc. provided in vehicle 2001.

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
110 Reception unit
120 Transmission unit
130 Control unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory

1003 Storage
1004 Communication device
1005 Input device
1006 Output device
1007 Bus
2001 Vehicles
2002 Drive
2003 Steering
2004 Axel pedal
2005 Brake pedal
2006 Schiff lever
2007 Left and right front wheels
2008 Right and left rear wheels
2009 Axles
2010 Electronic control unit
2012 Information service unit
2013 Communication module
2021 Current sensor
2022 Speed sensor
2023 Air pressure sensor
2024 Vehicle speed sensor
2025 Acceleration sensor
2026 Brake pedal sensor
2027 Shift lever sensor
2028 Object detection sensor
2029 Axel pedal sensor
2030 Operation support system section
2031 Microprocessor
2032 Memory (ROM, RAM)
2033 Communication port

The invention claimed is:

1. A terminal comprising:

a receiver that receives downlink control information (DCI) scrambled by a radio network temporary identifier (RNTI) which is common to a plurality of terminals, in a multicast/broadcast service (MBS) for performing data delivering to the plurality of terminals; and a processor that determines a size of a first field among fields included in the downlink control information based on a higher layer parameter configured for the multicast/broadcast service, defined separately from a higher layer parameter for unicast transmission; wherein the downlink control information includes a frequency domain resource assignment field different from the first field, and the first field is one or more fields selected from a physical resource block bundling size indicator field, a rate matching field, a zero power channel state information reference signal trigger field, a priority indicator field, and a transmission configuration indication field.

2. A base station comprising:

a first transmitter that transmits downlink control information (DCI) scrambled by a radio network temporary identifier (RNTI) which is common to a plurality of terminals, in a multicast/broadcast service (MBS) for performing data delivering to the plurality of terminals; and a second transmitter that transmits a higher layer parameter configured for the multicast/broadcast service, and defined separately from a higher layer parameter for unicast transmission, the higher layer parameter being used for determining a size of a first field among fields included in the downlink control information; wherein the downlink control information includes a frequency domain resource assignment field different from the first field, and the first field is one or more fields selected from a physical resource block bundling size indicator field, a rate matching field, a zero power channel state information reference signal trigger field, a priority indicator field, and a transmission configuration indication field.

3. A radio communication system comprising:

a terminal; and a base station; wherein the base station comprises a transmitter that transmits downlink control information (DCI) scrambled by a radio network temporary identifier (RNTI) which is common to a plurality of terminals, in a multicast/broadcast service (MBS) for performing data delivering to the plurality of terminals, the terminal comprises a processor that determines a size of a first field among fields included in the downlink control information based on a higher layer parameter configured for the multicast/broadcast service, and defined separately from a higher layer parameter for unicast transmission, the downlink control information includes a frequency domain resource assignment field different from the first field, and the first field is one or more fields selected from a physical resource block bundling size indicator field, a rate matching field, a zero power channel state information reference signal trigger field, a priority indicator field, and a transmission configuration indication field.

4. A radio communication method comprising:

a step of receiving downlink control information (DCI) scrambled by a radio network temporary identifier (RNTI) which is common to a plurality of terminals, in a multicast/broadcast service (MBS) for performing data delivering to the plurality of terminals; and a step of determining a size of a first field among fields included in the downlink control information based on a higher layer parameter configured for the multicast/broadcast service, and defined separately from a higher layer parameter for unicast transmission; wherein the downlink control information includes a frequency domain resource assignment field different from the first field, and the first field is one or more fields selected from a physical resource block bundling size indicator field, a rate matching field, a zero power channel state information reference signal trigger field, a priority indicator field, and a transmission configuration indication field.

* * * * *